(12) United States Patent
Mazzocchi et al.

(10) Patent No.: US 8,544,879 B1
(45) Date of Patent: Oct. 1, 2013

(54) ACTIVE BOLSTER WITH STEPPED BLADDER SPACING

(71) Applicant: Ford Global Technologies, LLC, Dearborn, MI (US)

(72) Inventors: Nicholas A. Mazzocchi, Ann Arbor, MI (US); Stacey H. Raines, Ypsilanti, MI (US); Latasha N. Smith, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/626,069

(22) Filed: Sep. 25, 2012

(51) Int. Cl.
*B60R 21/206* (2011.01)

(52) U.S. Cl.
USPC ........................................ 280/730.1; 280/752

(58) Field of Classification Search
USPC ................... 280/730.1, 752, 753, 732, 743.1; 296/70
See application file for complete search history.

(56) References Cited

U.S. PATENT DOCUMENTS

| | | | |
|---|---|---|---|
| 6,619,689 B2 | 9/2003 | Spencer et al. | |
| 6,758,493 B2 | 7/2004 | Conlee et al. | |
| 7,350,852 B2* | 4/2008 | Rust et al. | 296/187.06 |
| 7,810,837 B2 | 10/2010 | Thomas et al. | |
| 7,980,589 B2 | 7/2011 | Best et al. | |
| 7,992,895 B2 | 8/2011 | Roychoudhury et al. | |
| 8,388,020 B2* | 3/2013 | Ciplijauskas et al. | 280/743.1 |
| 2001/0054811 A1* | 12/2001 | Spencer et al. | 280/730.1 |
| 2010/0194081 A1* | 8/2010 | Thomas et al. | 280/730.1 |

* cited by examiner

*Primary Examiner* — Drew Brown

(74) *Attorney, Agent, or Firm* — Vichit Chea; MacMillan, Sobanski & Todd, LLC

(57) ABSTRACT

An active bolster for an automotive vehicle has an inner wall and an outer wall joined around a substantially closed perimeter to form an inflatable bladder. An inflator couples an inflation gas into the inflatable bladder in response to a crash event of the vehicle. The inner wall has an inner vessel region with a substantially-planar portion and an outer pleated region with a plurality of circumferential pleats, wherein each pleat has an inward edge and an outward edge. Adjacent pleats are continuous so that the inward edge of an outer pleat is shared as the outward edge of an inner pleat. The pleat edges have a stepped spacing from the outer wall that progressively decreases from an innermost edge to an outermost outward edge, whereby adjacent pleats unfold during inflation such that an inner pleat is unfolding with a substantially uniform pressure when an outer pleat begins to unfold.

11 Claims, 7 Drawing Sheets

ACTIVE BOLSTER WITH STEPPED BLADDER SPACING

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to active bolsters for occupant crash protection in automotive vehicles, and, more specifically, to an active bolster with an inflatable bladder formed by a plastic panel with pleats that unfold during inflation so that the bolster moves evenly into position for cushioning an impacting body.

An active bolster is a vehicle occupant protection device with a gas-inflatable bladder to absorb impacts and reduce trauma to occupants during a crash. As opposed to deployable air bag cushions that emerge from behind various openings upon inflation, active bolsters use the interior trim surface itself to expand at the beginning of a crash event for absorbing the impact and dissipating energy through the action of an inflation gas. U.S. Pat. No. 8,205,909, issued Jun. 26, 2012, incorporated herein by reference, discloses an active knee bolster integrated into a glove box door that is light weight and visually attractive. Pending U.S. application Ser. No. 13/089,401, filed Apr. 19, 2011, also incorporated herein by reference, discloses a typical structure wherein an active bolster includes a front wall or panel that faces a vehicle occupant attached to a base wall or panel along a sealed periphery. One or both of the walls is deformable in order to provide an inflatable bladder. For example, the base wall may have a pleated (i.e., accordion-like) region that straightens out during inflation. The walls are initially spaced apart by a small amount when in their pre-deployment, non-inflated condition. This allows ingress of the inflation gas in a manner that achieves even inflation across the panel.

The front and base walls of a typical active bolster are comprised of molded thermoplastics such as polyethylene, polyolefin, or PVC. They are typically injection molded but could also be blow molded. When formed separately, the front and base walls must be hermetically joined around their periphery in order to form the inflatable bladder. The joint must be strong to resist separation as a result of the high pressures during inflation.

Expansion of an active bolster must be consistent in order to achieve a reliable placement in a position for optimally receiving the body of an impacting passenger. For example, with an active knee bolster mounted in a glove box door, an even expansion is desirable in order to capture both knees of the passenger as close to the same time as possible. Due to the need for fast deployment, a relatively high pressure, high volume inflator is used. The high forces from the inflation gas often lead to an uneven expansion of the bolster which may vary from one unit to the next. Besides a lack of control over the shape or positioning of the bolster during expansion, an uneven expansion can involve a portion of the bladder expanding at a much greater rate than other portions, which results in an increase in stress applied to the hermetic seal at that portion. Consequently, the weld between the walls of the bladder may be more likely to fail during deployment.

SUMMARY OF THE INVENTION

The present invention employs a baffle structure configured to expand at a consistent rate across the full circumference of the bladder. The arrangement of the pleats ensures that as one pleat unfolds, the applied pressure equalizes around the circumference before the next pleat begins to unfold.

In one aspect of the invention, an active bolster for mounting at an interior trim surface of an automotive vehicle is comprised of a plastic-molded, expandable inner wall and a plastic-molded outer wall joined around a substantially closed perimeter with the inner wall to form an inflatable bladder. The outer wall has a substantially-planar first bladder surface facing the inner wall and the inner wall has a second bladder surface facing the outer wall. An inflator couples an inflation gas into the inflatable bladder in response to a crash event of the vehicle. The second bladder surface has an inner vessel region with a substantially-planar portion and an outer pleated region with a plurality of circumferential pleats, wherein each pleat has an inward edge and an outward edge. Adjacent pleats are continuous so that the inward edge of an outer pleat is shared as the outward edge of an inner pleat. The pleat edges have a stepped spacing from the first bladder surface that progressively decreases from an innermost inward edge of the pleated region to an outermost outward edge of the pleated region, whereby adjacent pleats unfold during inflation such that an inner one of the adjacent pleats is unfolding with a substantially uniform pressure when an outer one of the adjacent pleats begins to unfold.

DETAILED DESCRIPTION OF PREFERRED EMBODIMENTS

Figure 1:
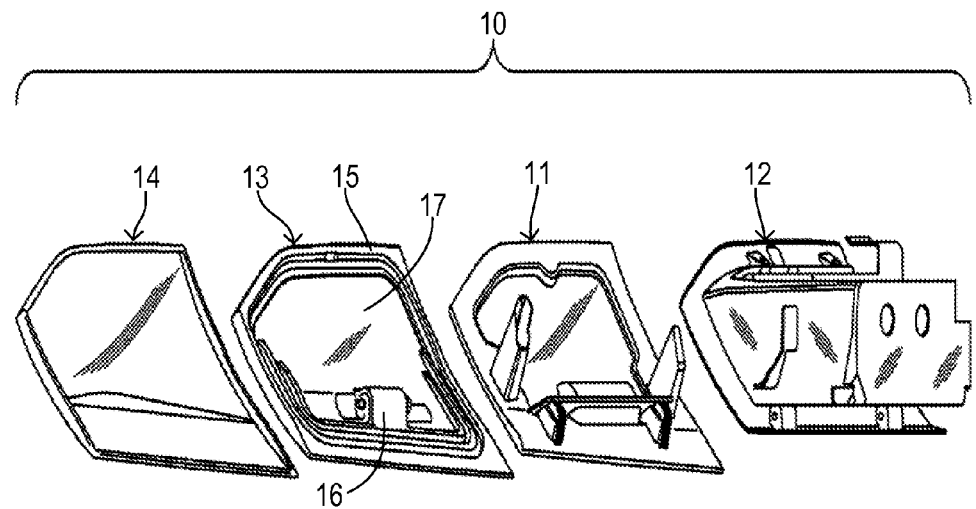
FIG. 1 is an outward-looking, exploded perspective view of an active knee bolster glove box door system of a type to which the present invention can be applied.

Referring now to FIG. 1, a prior art active knee bolster system 10 has a base panel component 11 which forms the foundation for the bolster. Base 11 may be either attached to the vehicle by hinging from a storage cavity or glove box 12 as shown in FIG. 1, or mounted to another structure such as an instrument panel support below a steering column, for example. Such locations are accessible to the knees of an individual riding in a corresponding seating position within a vehicle.

Base 11 acts as a reaction surface for supporting an inflatable bladder formed by an inner wall 13 and an outer wall 14 that are joined around their periphery 15. Walls 13 and 14 are preferably comprised of molded plastics (such as thermoplastic polyolefin (TPO)) and are joined by plastic welding, such as hot plate welding, to form a peripheral seal around a central region 17 for forming a bladder. An inflation gas source 16 is electronically controlled for activating during a crash to release gas to inflate the bolster. Outer wall 14 may comprise the Class A interior trim surface such as the outside of the glove box door, or an additional skin or cover (not shown) can be applied to its outer surface.

Figure 2:
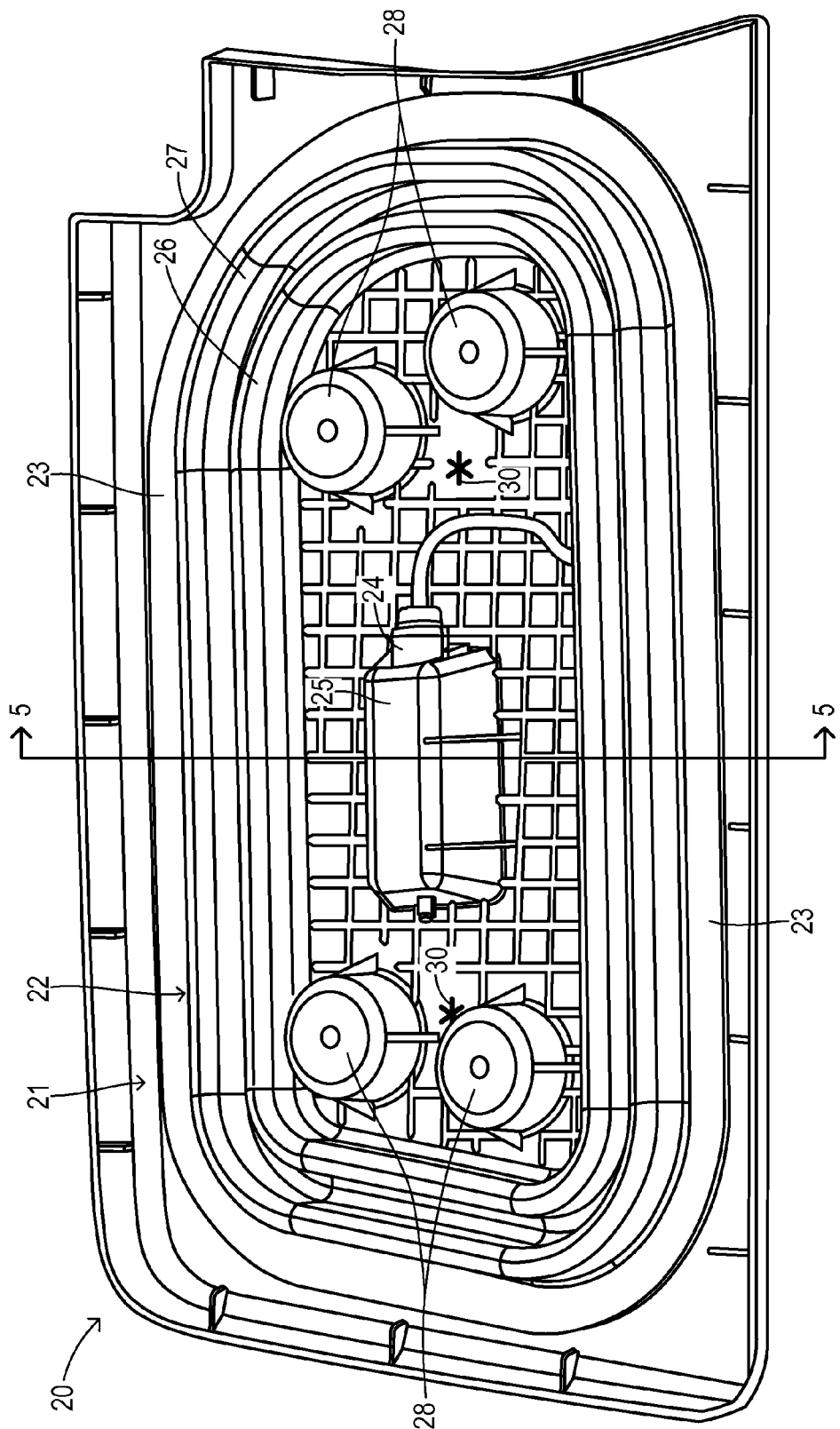
FIG. 2 is a plan view of an inner and outer wall assembly of an active bolster.

FIG. 2 is a rear view of an inflatable bladder 20 in one preferred embodiment of the invention. A plastic-molded outer wall 21 overlies a plastic-molded, expandable inner wall 22. Walls 21 and 22 are joined around a closed perimeter region 23 to form an inflatable bladder having an open central volume between walls 21 and 22 to receive an inflation gas from an inflator 24 mounted in a recess 25 of inner wall 22 during a crash event. Inner wall 22 includes a plurality of pleats, such as 26 and 27, to accommodate the expansion of inner wall 22 during inflation. A plurality of bosses 28 are used to mount inner wall 22 to a reaction surface. Vent holes 30 comprised of an asterisk-shaped pattern cut through inner wall 22 may be included for venting the central volume prior to and during inflation.

Figure 3:
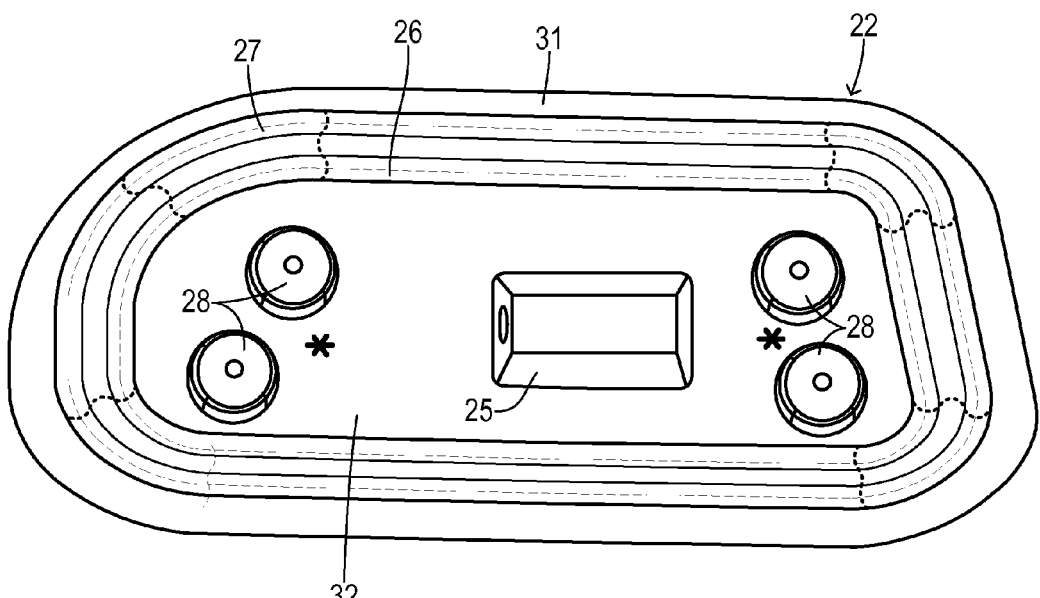
FIG. 3 is a perspective view of the side of the inner wall that faces the outer wall.
Figure 4:
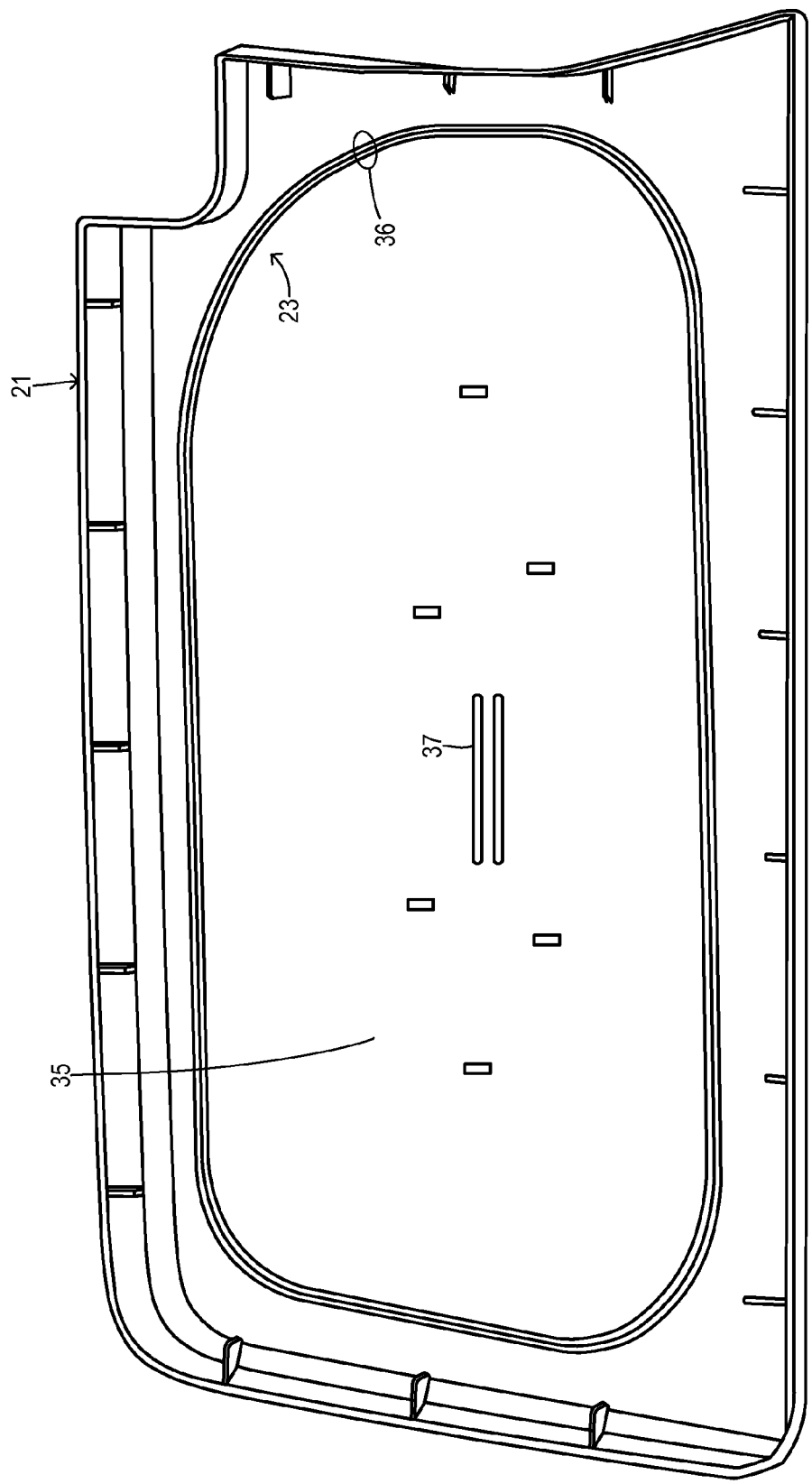
FIG. 4 is a perspective view of the outer wall of FIG. 2 with the inner wall removed.

FIG. 3 shows a bladder-surface side of inner wall 22 that faces the outer wall. A flange 31 coincides with the closed perimeter region and surrounds a pleated region comprising pleats 26 and 27 and an inner vessel region with a substantially planar portion 32 into which receptacle 25 and bosses 28 are recessed. FIG. 4 shows outer wall 21 with inner wall 22 removed, revealing a bladder surface 35 that faces the inner wall. A plurality of upstanding ribs 36 follow closed perimeter region 23 and are joined with flange 31 of inner wall 22 by hot welding to create a hermetic seal for the inflatable bladder. Ribs 37 are provided for supporting the inflator.

Figure 5:
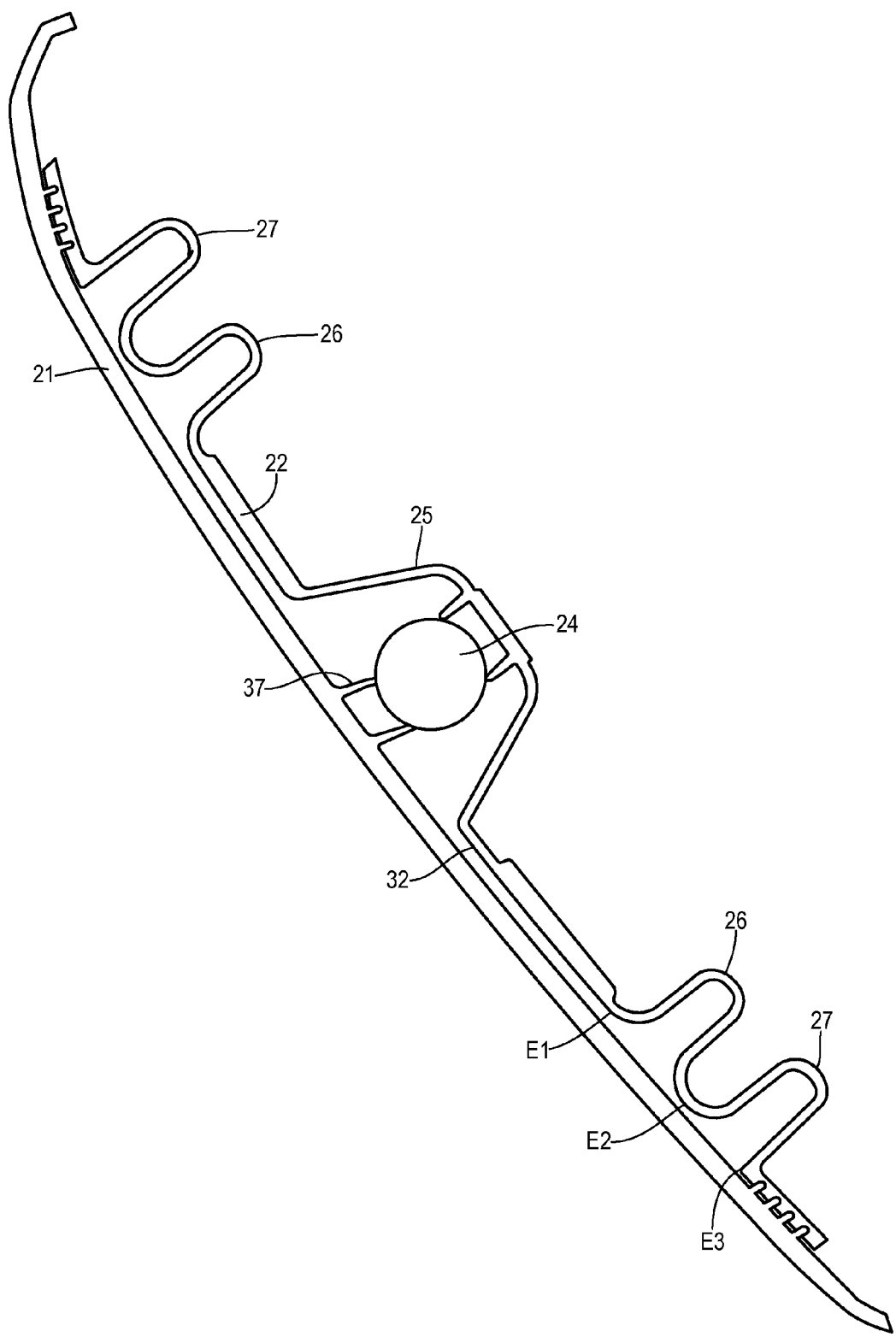
FIG. 5 is a cross-sectional view of the active bolster taken along line 5-5 in FIG. 2.

FIG. 5 shows a cross-section of the inflatable bladder along lines 5-5 of FIG. 2. It can be seen that outer wall 21 has a substantially-planar first bladder surface facing and spaced from inner wall 22. Inner vessel region 32 on inner wall 22 is initially spaced from outer wall 21 by a distance on the order of about 6 millimeters to provide an initial space for receiving inflation gas from inflator 24 during inflation. Pleats 26 and 27 are formed in inner wall 22 radially outward from inner vessel region 32, with each pleat defining an inward edge and an outward edge at respective distances from inner vessel region 32. Each edge corresponds to a position of closest approach to outer wall 21 in the pre-inflated shape of the bladder. Thus, pleat 26 has an inward edge E1 and an outward edge E2. Adjacent pleats are preferably continuous so that the inward edge of an outer pleat is shared as the outer edge of an inner pleat. For example, edge E2 is both an outward edge of pleat 26 and an inward edge of pleat 27. Edge E3 is an outward edge of pleat 27.

The unfolding of each respective pleat during inflation occurs when inflation gas enters the area under each pleat and forces an expansion. According to the present invention, the pleat edges have a stepped spacing from outer wall 21 that progressively decreases from an innermost inward edge E1 to an outermost outward edge E3 of the pleats. In embodiments with more than two pleats, the same relationship holds whereby the progressive decrease of the spacing with each successive pleat edge moving outward from the inner vessel region to the closed perimeter of the inflatable bladder.

By providing a spacing for each respective pleat wherein its inward edge is spaced from the outer wall by a greater distance than its outward edge, inflation gas more fully enters the pleat around the full circumference before the inflation gas begins to squeeze past the pleat to enter the succeeding pleat. Thus, adjacent pleats unfold during inflation such that an inner one of the adjacent pleats is unfolding with a substantially uniform pressure by the time that the outer one of the adjacent pleats begins to unfold as a result of the entry of inflation gas.

As shown in FIG. 5, inner vessel region 32 (up to the innermost inward edge E1) preferably has a substantially uniform spacing from the bladder surface of outer wall 21. Since the outermost pleat 27 has its outermost outward edge (E3) coinciding with the hermetically-sealed closed perimeter of inner wall 22, the spacing at the outer most outward edge is effectively zero.

Figure 6:
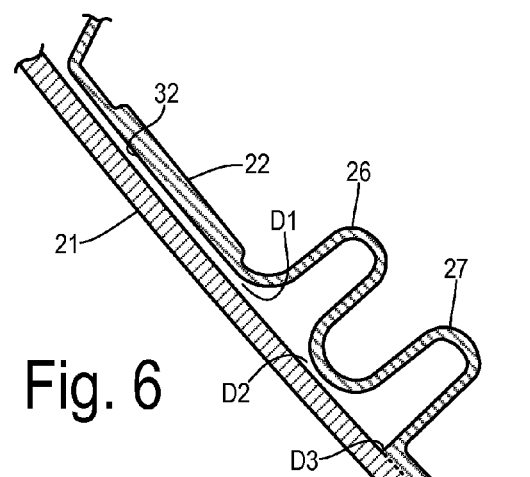
FIGS. 6-10 are cross-sectional views of the pleated region and a portion of the outer wall at respective stages of expansion during a deployment.
Figure 7:
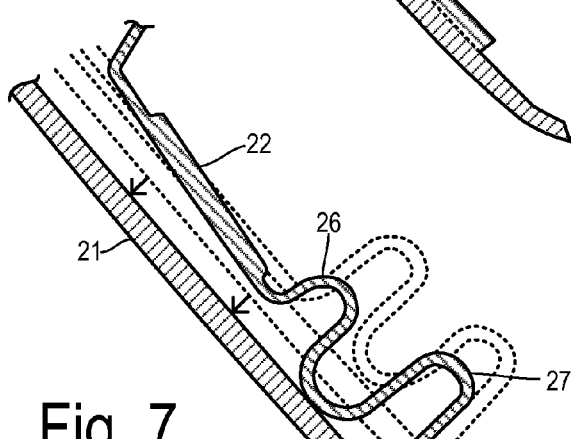

FIG. 6 shows the progressive spacing of the pleat edges in greater detail. Inner vessel region 32 of inner wall 22 and the inward edge of pleat 26 are spaced from outer wall 21 by a distance D1. The shared outward edge of pleat 26 and inward edge of pleat 27 is spaced from outer wall 21 by a distance D2. The outward edge of pleat 27 is spaced by a distance D3 from outer wall 21. According to the progressive decrease of the invention, D1 is greater than D2, and D2 is greater than D3. Since no inflation gas flows radially outward from pleat 27, the value of D3 is zero by definition.

Figure 8:
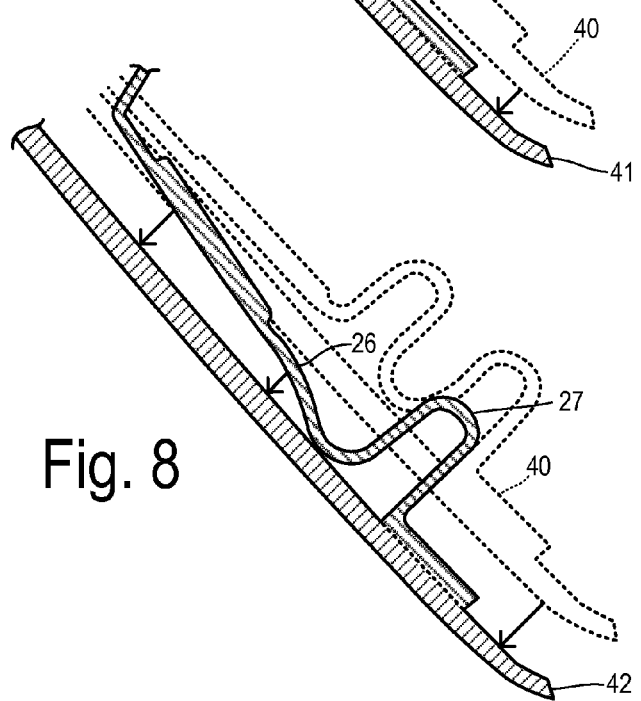
Figure 10:
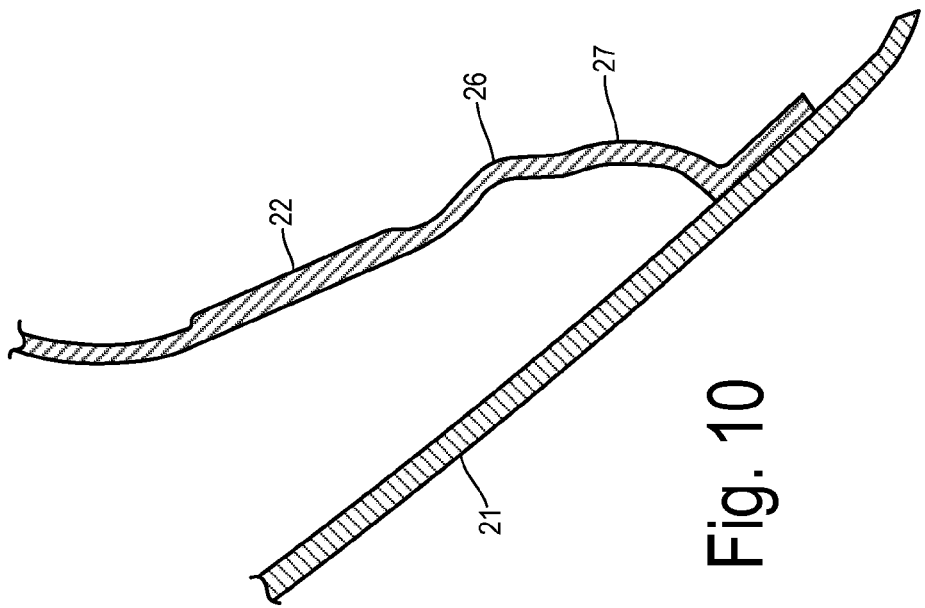
Figure 9:
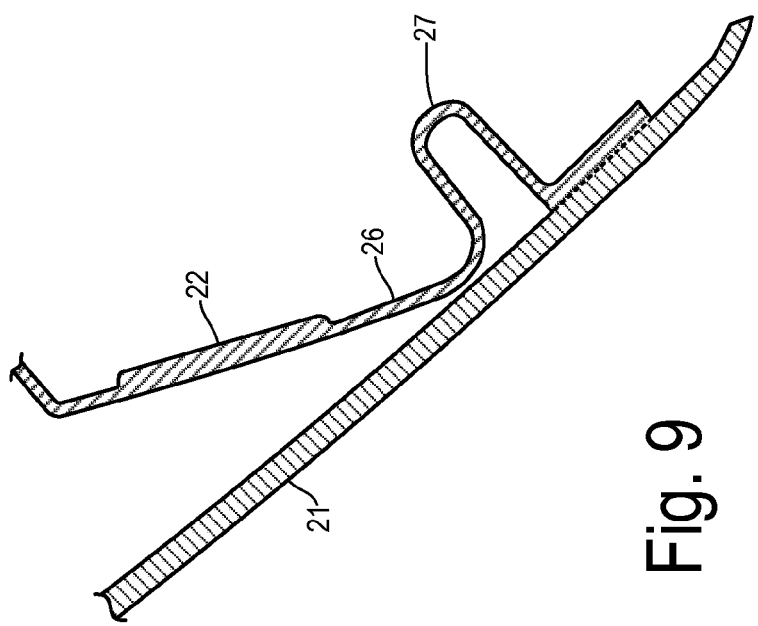

FIGS. 7-10 illustrate the sequential unfolding of the pleats during inflation of the bladder. Thus, in FIG. 7 inflation gas generated from the inflator enters an inner vessel volume which begins to increase thereby moving outer wall 21 from an initial position shown in dashed lines at 40 to an expanding position 41. Pleat 26 readily fills with expansion gas as a result of the initial spacing D1, but a lesser amount of inflation gas passes beyond the outward edge of pleat 26 because of a closer spacing. Once the expansion gas enters the full circumference of pleat 26, pleat 26 begins to unfold with a substantially uniform pressure. Pleat 26 increasingly unfolds as shown in FIG. 8 so that outer wall 21 moves to a further expanded position 42. Eventually, the expansion causes the spacing at the inward edge of pleat 27 to open up as shown in FIG. 9. Pressure remains substantially uniform around the entire perimeter as pleat 27 unfolds as shown in FIG. 10. The orderly progression of the unfolding action results in an even, controlled movement of the outer wall into the desired position. This maintains a uniform application of stresses across the entire circumference of the hermetic seal along the closed perimeter of the bladder.

Figure 11:
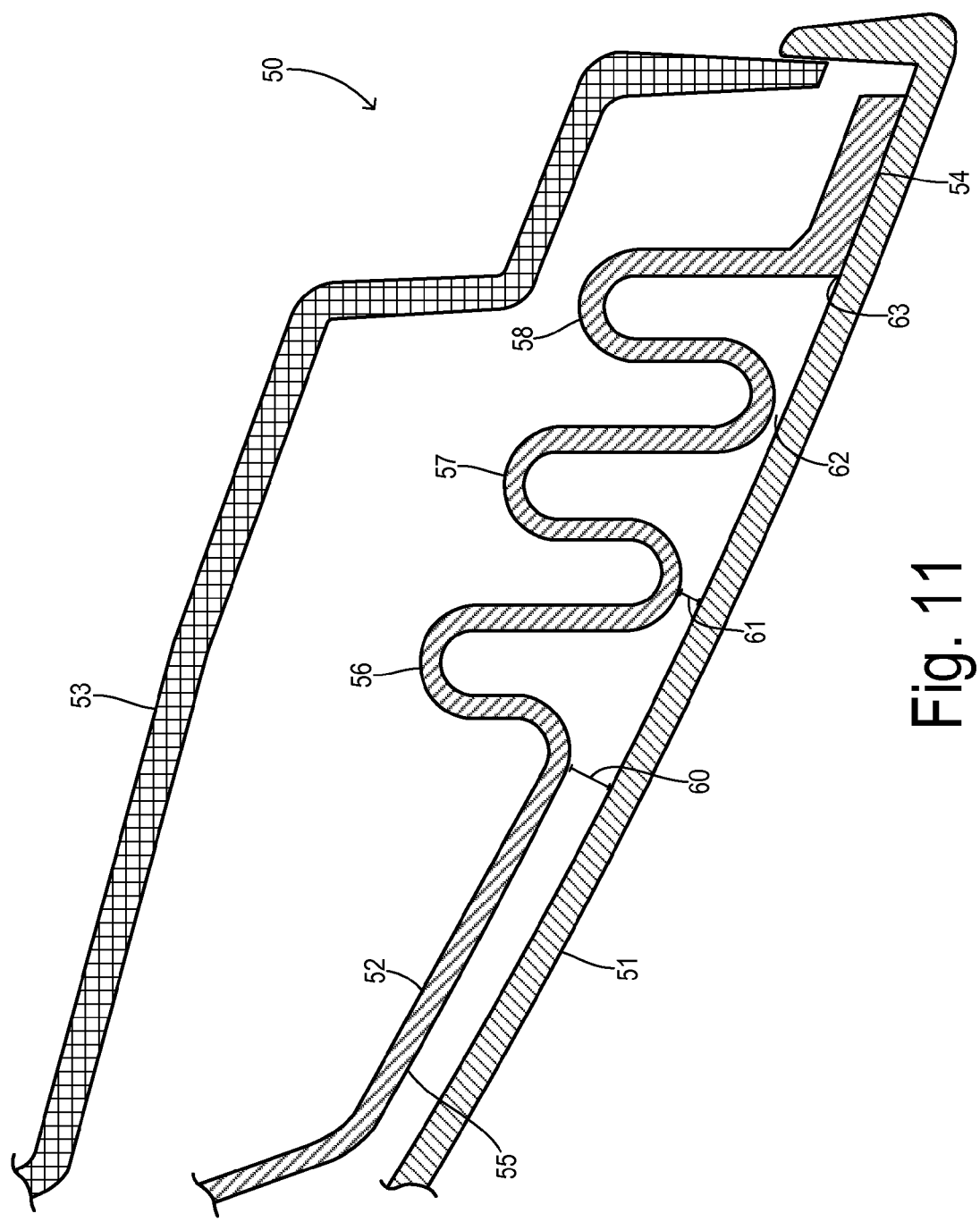
FIG. 11 is a cross section of an alternative embodiment for the inflatable bladder having an increased number of pleats.

FIG. 11 shows an alternative embodiment incorporating three sequential pleats. Thus, an active bolster 50 includes an outer wall 51 and an inner wall 52 joined around a closed perimeter by a hermetic seal 54. A back plate 53 is mounted to a vehicle and provides a reaction surface for the expansion. Inner wall 52 has an inner vessel region 55 radially inward from a series of pleats 56, 57, and 58. Inner vessel region 55 and an inward edge of pleat 56 are spaced from outer wall 51 by a spacing 60. Pleat 56 has an outward edge spaced from outer wall 51 by a spacing 61. Since pleat 57 shares its inward edge with the outward edge of pleat 56, pleat 57 has its inward edge spaced from outer wall 51 by spacing 61. Similarly, an edge between pleats 57 and 58 is spaced from outer wall 51 by a spacing 62. The outermost outward edge which is part of pleat 58 has a spacing 63 which corresponds to zero. The other spacings are progressively decreasing from the innermost inward edge to the outermost outward edge, such that spacing 60 is greater than spacing 61, spacing 61 is greater than spacing 62, and spacing 62 is greater than spacing 63. In one particular embodiment, spacing 60 was equal to 6 millimeters, spacing 61 was equal to 4 millimeters, and spacing 62 was equal to 2 millimeters. A sequential unfolding was achieved by equalizing the forces circumferentially for each pleat, resulting in expansion at an equal rate around the circumference. Thus, reliability and consistency in the expansion trajectory have been achieved by the present invention.

What is claimed is:

1. An active bolster for mounting at an interior trim surface of an automotive vehicle, comprising:
    a plastic-molded, expandable inner wall;
    a plastic-molded outer wall joined around a substantially closed perimeter with the inner wall to form an inflatable bladder, wherein the outer wall has a substantially-planar first bladder surface facing the inner wall and the inner wall has a second bladder surface facing the outer wall; and
    an inflator for coupling an inflation gas into the inflatable bladder in response to a crash event of the vehicle;
    wherein the second bladder surface has an inner vessel region with a substantially-planar portion and an outer pleated region with a plurality of circumferential pleats, wherein each pleat has an inward edge and an outward edge, and wherein adjacent pleats are continuous so that the inward edge of an outer pleat is shared as the outward edge of an inner pleat; and
    wherein the pleat edges have a stepped spacing from the first bladder surface that progressively decreases from an innermost inward edge of the pleated region to an outermost outward edge of the pleated region, whereby adjacent pleats unfold during inflation such that an inner one of the adjacent pleats is unfolding with a substantially uniform pressure when an outer one of the adjacent pleats begins to unfold.

2. The active bolster of claim 1 wherein the planar portion of the inner vessel region has a substantially uniform spacing from the first bladder surface that is substantially equal to a spacing of the innermost inward edge.

3. The active bolster of claim 1 wherein a spacing between the outermost outward edge and the first bladder surface is substantially zero, and wherein the outermost outward edge is disposed along the closed perimeter.

4. The active bolster of claim 1 wherein the inner vessel region further includes a receptacle, and wherein the inflator is mounted in the receptacle.

5. The active bolster of claim 1 wherein the inner and outer walls are comprised of thermoplastic polyolefin, and wherein the inner and outer walls are joined by a hot weld along the closed perimeter.

6. A method of inflating an active bolster mounted at an interior trim surface of an automotive vehicle, comprising the steps of:
    joining a plastic-molded, expandable inner wall to a plastic-molded outer wall around a substantially closed perimeter to form an inflatable bladder, wherein the outer wall has a substantially-planar first bladder surface facing the inner wall and the inner wall has a second bladder surface facing the outer wall, wherein the second bladder surface has an inner vessel region with a substantially-planar portion and an outer pleated region with a plurality of circumferential pleats, wherein each pleat has an inward edge and an outward edge, wherein adjacent pleats are continuous so that the inward edge of an outer pleat is shared as the outward edge of an inner pleat, and wherein the pleat edges have a stepped spacing from the first bladder surface that progressively decreases from an innermost inward edge of the pleated region to an outermost outward edge of the pleated region;
    in response to a crash event of the vehicle, coupling an inflation gas into the inflatable bladder; and
    progressively unfolding the pleats as the inflatable bladder expands, whereby the stepped spacing causes adjacent pleats to unfold during inflation such that an inner one of the adjacent pleats is unfolding with a substantially uniform pressure when an outer one of the adjacent pleats begins to unfold.

7. The method of claim 6 wherein the planar portion of the inner vessel region has a substantially uniform spacing from the first bladder surface that is substantially equal to a spacing of the innermost inward edge.

8. The method of claim 6 wherein a spacing between the outermost outward edge and the first bladder surface is substantially zero, and wherein the outermost outward edge is disposed along the closed perimeter.

9. The method of claim 6 wherein the inner vessel region further includes a receptacle, and wherein the inflator is mounted in the receptacle.

10. The method of claim 6 wherein the inner and outer walls are comprised of thermoplastic polyolefin, and wherein the inner and outer walls are joined by a hot weld along the closed perimeter.

11. An inflatable bladder for an active bolster, comprising:
    an outer wall; and
    an inner wall with a plurality of circumferential pleats around a central volume, wherein the pleats approach the outer wall at pleat edges having a stepped spacing that progressively decreases from an innermost inward edge of the pleats to an outermost outward edge of the pleats, so that one pleat unfolds with a substantially uniform pressure before a successive pleat begins to unfold.

* * * * *